US012811472B2

(12) United States Patent
Kuznetsov

(10) Patent No.: US 12,811,472 B2
(45) Date of Patent: Nov. 24, 2026

(54) MULTI-PORT ENERGY STORAGE SYSTEM AND CONTROL FOR LASER POWER SUPPLY

(71) Applicant: Raytheon Company, Tewksbury, MA (US)

(72) Inventor: Stephen B. Kuznetsov, Marlborough, MA (US)

(73) Assignee: Raytheon Company, Arlington, VA (US)

( * ) Notice: Subject to any disclaimer, the term of this patent is extended or adjusted under 35 U.S.C. 154(b) by 293 days.

(21) Appl. No.: 18/638,477

(22) Filed: Apr. 17, 2024

(65) Prior Publication Data

US 2025/0330066 A1 Oct. 23, 2025

(51) Int. Cl.
*H02K 11/00* (2016.01)
*H02K 5/04* (2006.01)
*H02K 7/00* (2006.01)
*H02K 11/33* (2016.01)

(52) U.S. Cl.
CPC ........... *H02K 11/0094* (2013.01); *H02K 5/04* (2013.01); *H02K 7/003* (2013.01); *H02K 11/33* (2016.01)

(58) Field of Classification Search
CPC .... H01F 38/18; H02J 3/01; H02J 3/38; H02K 11/0094; H02K 11/33; H02K 16/00; H02K 19/34; H02K 39/00; H02K 47/18; H02K 5/04; H02K 7/003; H02K 7/025; H02P 25/184; H02P 9/48
See application file for complete search history.

(56) References Cited

U.S. PATENT DOCUMENTS

| | | | | |
|---|---|---|---|---|
| 5,347,191 | A | 9/1994 | Wood | |
| 8,749,098 | B2 | 6/2014 | Chan et al. | |
| 9,373,963 | B2 * | 6/2016 | Kuznetsov | H02J 4/00 |
| 9,531,247 | B2 | 12/2016 | Kuznetsov | |
| 10,298,212 | B2 | 5/2019 | Kuznetsov | |
| 11,418,031 | B2 | 8/2022 | Kuznetsov | |
| 2004/0245877 | A1 | 12/2004 | Khalizadeh | |
| 2019/0036336 | A1 * | 1/2019 | Kuznetsov | H02J 3/30 |
| 2022/0320935 | A1 * | 10/2022 | Kuznetsov | H02P 25/24 |

(Continued)

FOREIGN PATENT DOCUMENTS

| | | | | | |
|---|---|---|---|---|---|
| CN | 112531652 | A | * | 3/2021 | H02J 3/18 |
| JP | 2014505458 | A | * | 2/2014 | H02K 11/33 |

OTHER PUBLICATIONS

Translation for CN112531652A (Year: 2021).*

(Continued)

*Primary Examiner* — Christopher M Koehler
*Assistant Examiner* — Ethan Nguyen Vo

(57) ABSTRACT

A hybrid induction machine includes a stator with an input winding, a plurality of output windings with output ports, and a rotor connected to a flywheel operating as a reserve of kinetic energy to buffer surges in demand for electrical power due to large, pulsed loads with high repetition rates. Degradation of power quality at the output ports of the hybrid induction machine due to electrical noise on a main bus providing electrical power to the hybrid induction machine and other apparatus can be eliminated through the use of feed-forward harmonic cancellation signals, galvanic and magnetic isolation of the output ports, and damper networks.

20 Claims, 12 Drawing Sheets

(56) References Cited

U.S. PATENT DOCUMENTS

| | | | | |
|---|---|---|---|---|
| 2023/0170705 | A1* | 6/2023 | Howard | H02J 3/0014 |
| 2023/0412035 | A1* | 12/2023 | Liben | H02K 5/20 |

OTHER PUBLICATIONS

Translation for JP 2014505458 (Year: 2012).*

International Search Report and Written Opinion of the International Searching Authority dated Jul. 24, 2025 in connection with International Patent Application No. PCT/US2025/024097, 15 pages.

* cited by examiner

MULTI-PORT ENERGY STORAGE SYSTEM AND CONTROL FOR LASER POWER SUPPLY

TECHNICAL FIELD

This disclosure relates generally to electric power generation and buffering electrical power supplies. More specifically, this disclosure relates to a multi-port energy storage system and control for a power supply to a pulsed load, such as a laser.

BACKGROUND

When interposed between a bus powered by a primary AC generator (for example, a turbine generator) and apparatus creating large, pulsed current loads, induction machines with hybrid (for example, kinetic and electrical) energy storage units can provide a buffer to generally prevent sagging and variation in AC power supplied to the apparatus. However, even when an asynchronous induction machine is used, large current loads from other apparatus on a main bus powering the hybrid induction machine can introduce noise into the power waveforms at the ports of the induction machine.

SUMMARY

This disclosure relates to a multi-port energy storage system for an apparatus drawing pulsed current loads, such as a laser power supply.

In a first embodiment, a system for stabilizing and smoothing an electric power supply, the system includes a hybrid induction machine. The hybrid induction machine includes a stator housing, a stator disposed in the stator housing. The stator includes an input winding for a polyphase AC input signal, wherein the input winding is connected to an input port, and wherein the input winding comprises a first plurality of phase windings. The stator includes a first output winding for a first polyphase AC output signal, wherein the first output winding is connected to a first output port, and wherein the first output winding comprises a second plurality of phase windings. The stator includes a second output winding for a second polyphase AC output signal, wherein the second output winding is connected to a second output port, and wherein the second output winding comprises a third plurality of phase windings. The hybrid induction machine includes a rotor having a shaft and disposed to rotate within a magnetic field of the input winding, the first output winding and the second output winding, wherein the shaft is connected to an energy storage device, such as flywheel. The rotor further includes a primary rotor winding for a polyphase AC excitation signal, wherein the primary rotor winding is connected to a first rotor port, and wherein the primary rotor winding comprises a fourth set of phase windings in a same number of poles as the first plurality of phase windings, wherein each phase winding is connected to one or more primary slip rings of a current collector on the shaft. The system includes a rotor exciter connected to the first rotor port and configured to provide an AC excitation signal. The system includes a power converter configured to receive a receive power from a main electrical bus and provide AC power at a first frequency to the input port. In some embodiments, the system includes a variable-frequency excitation system to power the primary rotor winding and permit the frequency of the first and second output windings to remain constant during a discharge period of the energy storage unit.

In a second embodiment, a hybrid induction machine includes a stator housing, a stator disposed in the stator housing. The stator includes an input winding for receiving a polyphase AC input signal, wherein the input winding is connected to an input port, and wherein the input winding comprises a first plurality of phase windings. The stator includes a first output winding for a first polyphase AC output signal, wherein the first output winding is connected to a first output port, and wherein the first output winding comprises a second plurality of phase windings. The stator includes a second output winding for a second polyphase AC output signal, wherein the second output winding is connected to a second output port, and wherein the second output winding comprises a third plurality of phase windings. The hybrid induction machine includes a rotor having a shaft and disposed to rotate within a magnetic field of the input winding, the first output winding and the second output winding, wherein the shaft is connected to an energy storage device, such as a flywheel. The rotor includes a primary rotor winding for a polyphase AC excitation signal, wherein the primary rotor winding is connected to a first rotor port, and wherein the primary rotor winding comprises a fourth set of phase windings in a same number of poles as the first plurality of phase windings, wherein each phase winding is connected to one or more primary slip rings of a current collector on the shaft. The hybrid induction machine includes a rotor exciter connected to the first rotor port and configured to provide an AC excitation signal. The input port is configured to receive AC power at a first frequency from a main bus via a power converter. The hybrid induction machine includes a secondary rotor winding which receives magnetization from a secondary stator output winding and is electrically connected to the primary rotor winding to boost a main excitation magnetic field.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
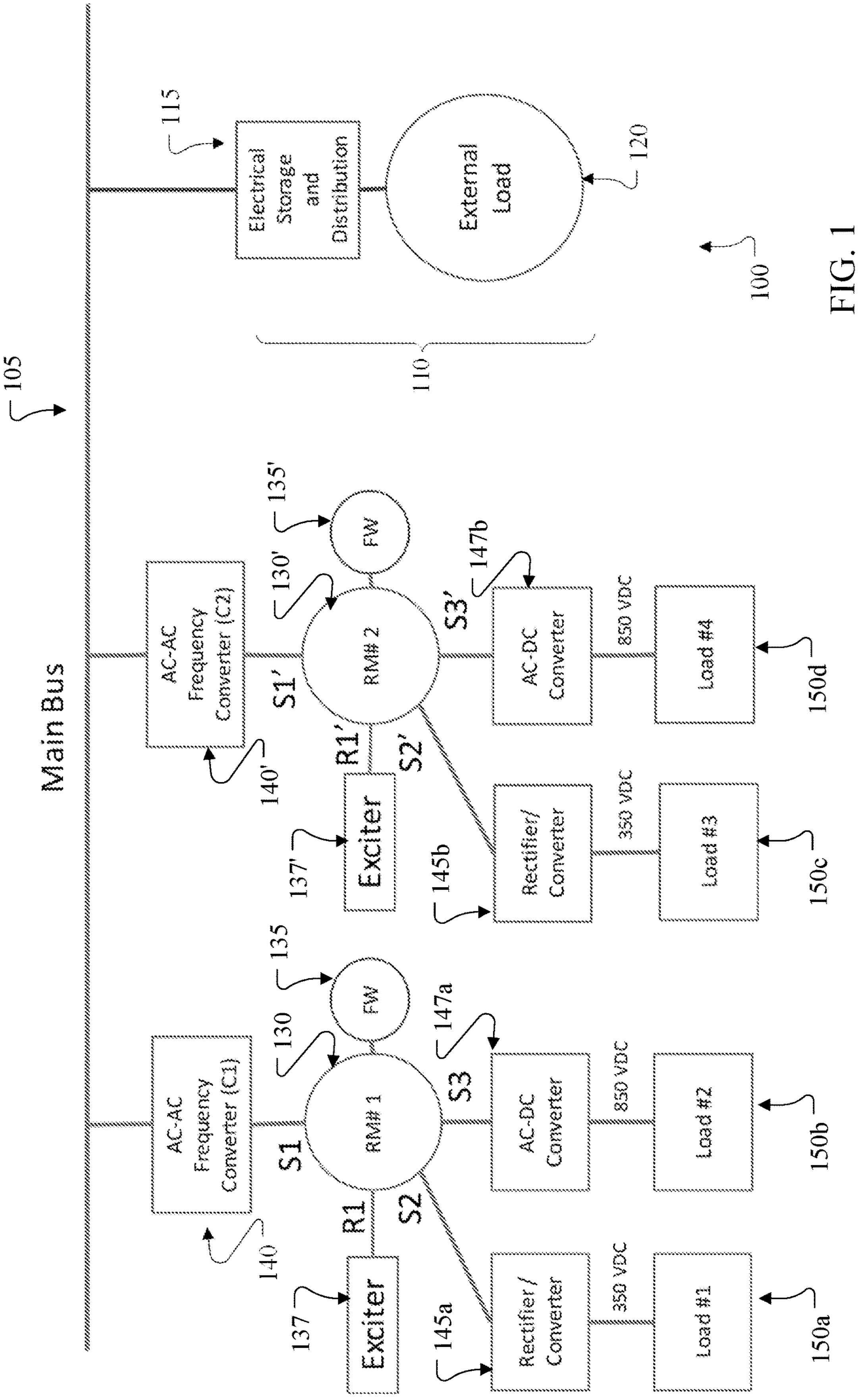
FIGS. 1 through 3 illustrate example systems comprising multi-port energy storage systems according to this disclosure.

FIGS. 1 through 8, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

The quality of alternating current (AC) power, both in terms of reliability and minimization of noise and other deviations from purely sinusoidal waveforms, supplied from a turbine generator or other primary AC generator to large, pulsed electrical loads can be significantly enhanced by interposing a hybrid induction machine which can draw upon both stored kinetic energy (stored in a flywheel) or electrical energy (for example, stored in a supercapacitor) between the pulsed load and turbine generator. Such induction machines can comprise a stator with a plurality of ports, including one or more ports which receive AC input power from one or more conditioning apparatus (for example, a variable motor drive to set the frequency of the AC input power) driven by a primary AC generator and an output port connected to one or more electrical loads. The motion of a wound rotor with a controllable AC excitation current through the magnetic field between the stator and rotor induces an AC current at the output port of the stator. Thanks to the facts that: a.) in contrast to synchronous electrical machines, in which the waveform properties (notably, the frequency of the output waveform) are necessarily linked to the rotational speed of the rotor; and b.) the stored kinetic energy in the flywheel is available to drive the rotor through the magnetic field between the rotor, such hybrid induction machines can dynamically buffer, or isolate the AC power and signal at the output ports of the hybrid induction machine from the overwhelming bulk of the variations in amplitude and signal quality (for example, deviations from sinusoidal waveforms) present in the AC power on a main bus powered by the primary AC generator. However, even with a hybrid induction machine, other loads on a bus feeding an input port, can introduce transients which are not fully filtered by the hybrid induction machine.

U.S. Pat. No. 11,038,398 the contents of which are incorporated by reference in their entireties, illustrate examples of induction machines, and methods and apparatus for stabilizing pulsed-load induced mechanical oscillations in the context of applications in which a power supply is buffered by hybrid induction machines. U.S. Pat. No. 11,632,021 the contents of which are incorporated by reference in their entireties, illustrate examples of either synchronous or asynchronous induction machines, and methods and apparatus for stabilizing a power supply is buffered by hybrid-type electrical machines.

Certain apparatus, such as pulsed lasers, draw large, stochastic current loads at high repetition rates, and even if powered by a rectified DC source, require "clean" (i.e., as close to perfectly sinusoidal) AC power be provided to the rectifier. Even the best lithium battery systems require approximately 30 seconds to recharge, which is too slow to handle the repetition rate at which the aforementioned apparatus draw large pulses of electrical energy. Similarly, large-capacity capacitor arrays present challenges associated with leakage and dielectric breakdowns which make them unsuitable for real-world applications, in which there can be lulls between pulsed load cycles. Experimental testing has shown that large capacitors will either draw down their charge during off-periods, and/or experience arcing and dielectric breakdowns due to the large amounts of held charge. Thus, hybrid induction machines represent the best presently available power solution for handling the large, spiky current demands the aforementioned apparatus create. However, ensuring optimum power quality in combination with the surge capacity to handle large, arbitrarily-timed pulsed loads, remains a source of technical challenges and opportunities for improvement in the art.

This disclosure provides a system for providing clean, buffered AC energy at multiple ports of a hybrid induction machine, wherein the ports of the hybrid induction machine power large, stochastically varying current loads, and the hybrid induction machine receives power from a main bus, wherein the main bus provides noisy AC or DC comprising harmonics or transients generated from other apparatus connected to the main bus. This disclosure also provides a hybrid induction machine, wherein the ports of the hybrid induction machine power large, stochastically varying current loads, and the hybrid induction machine receives power from a main bus, wherein the main bus provides noisy AC or DC comprising harmonics or transients generated from other apparatus connected to the main bus hybrid induction machine, and the hybrid induction machine regenerates power back to a main bus, based on excess energy available in the inertial energy storage unit.

Figure 2:
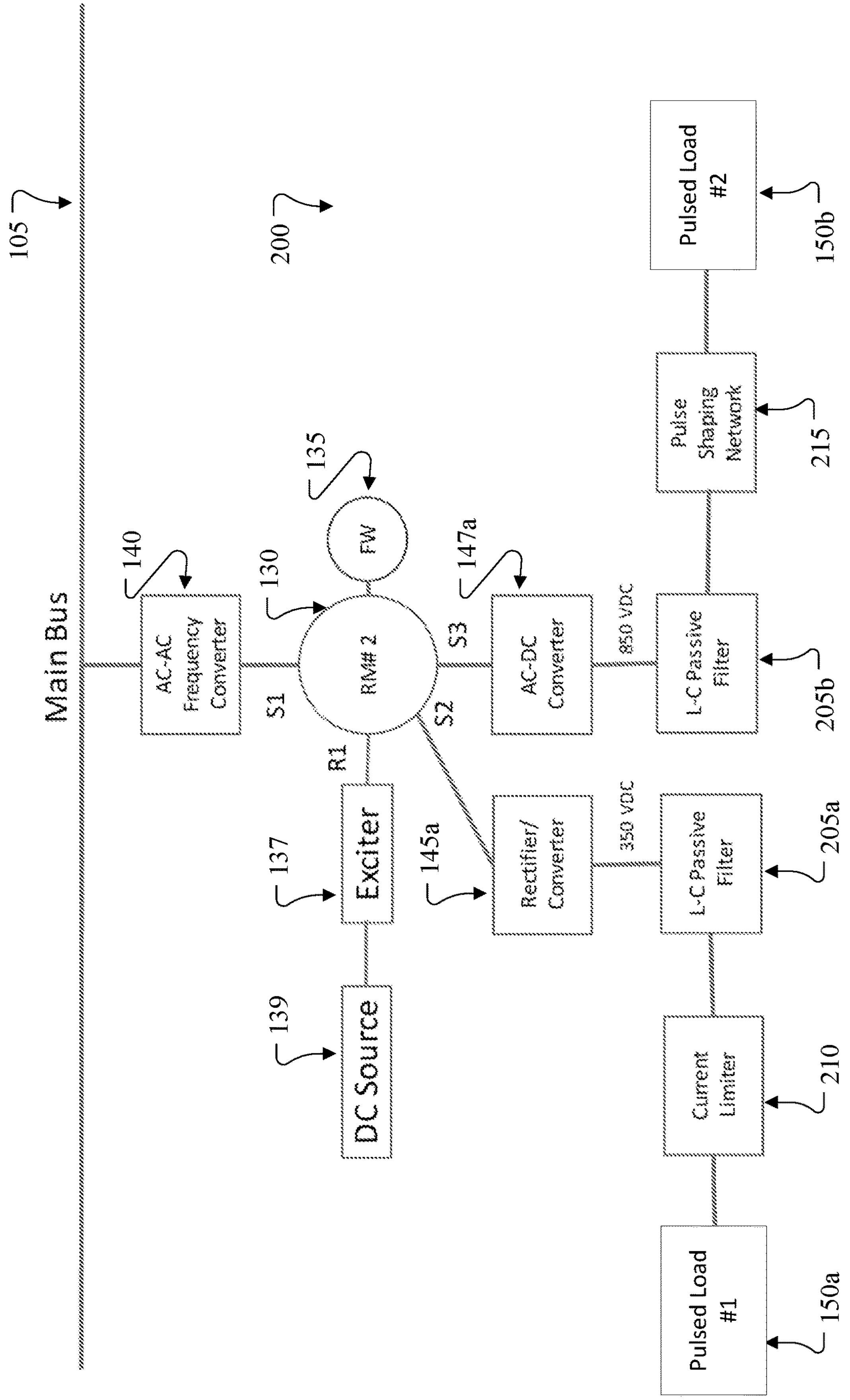
Figure 3:
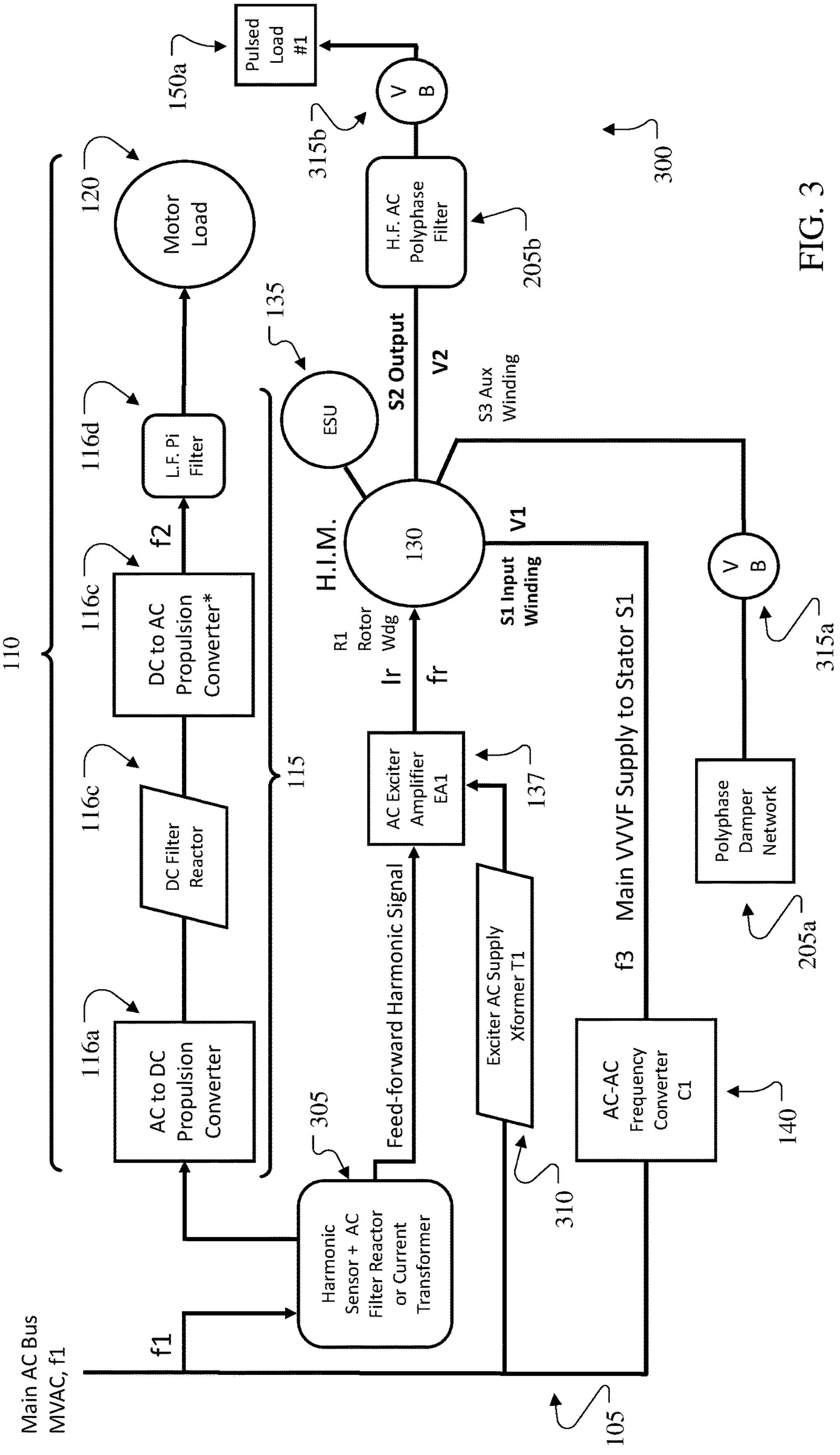

FIGS. 1 through 3 illustrate example systems in which one or more hybrid induction machines provide a buffered supply of clean AC power to a plurality of pulsed or otherwise stochastically varying loads, while at the same time, being powered, at least in part from a noisy main bus, in which the waveforms of the power signal contain transients, harmonics or other deviations induced by other apparatus powered by the main bus. For consistency and in convenience of cross-reference, elements common to more than one of FIGS. 1 through 3 are numbered similarly.

As shown in FIG. 1, a first example system 100 can comprise a main bus 105, wherein the main bus 105 is powered by one or more primary generators, for example, turbine generators. Main bus 105 can be either an AC or DC bus, and powers a plurality of apparatus within system 100. System 100 can include one or more unbuffered loads 110, which are powered by main bus 105, variations in the power drawn by one or more unbuffered loads 110 can generate noise, and excite transients and other deviations from a flat (i.e., where main bus 105 is a DC bus) or sinusoidal (i.e., where main bus 105 is an AC) voltage plot on main bus. Where example system 100 is a power network for a ship, unbuffered load 110 can be an integrated propulsion system (IPS), wherein, in lieu of a traditional propulsion architecture in which an engine or reactor turbine directly powers the shaft drive for a propeller, an IPS propulsion converter 115 connected to main bus 105 converts, stores and provides electrical energy to one or more IPS motors 120. Given that propulsion converter 115 needs to support the very large (i.e., multi-megawatt) power loads one or more IPS motors 120 draw, one or more unbuffered loads 110 can introduce significant amounts of noise and deviations from an intended voltage waveform at main bus 105.

Skilled artisans will appreciate that different apparatus exhibit different degrees of sensitivity to disturbances in power quality. At the insensitive end of the sensitivity spectrum are apparatus such as electric heaters, which are generally insensitive to power quality. At the sensitive end of the sensitivity spectrum are high-power imaging and sensor apparatus, such as lasers and microwave effectors, which are designed on the expectation of receiving clean and sag-free DC or AC electrical power.

Referring to the illustrative example of FIG. 1, system 100 comprises a first hybrid induction machine 130 and a second hybrid induction machine 130', which operate to provide continuous, clean power at each of their output ports to one or more apparatus drawing large, stochastically varying electrical loads with repeat rates on the order of ~1 pulse per second.

Referring to the explanatory example of FIG. 1, first hybrid induction machine 130 is "hybrid" in the sense that the power provided at its output ports (shown in the FIGURE as S2 and S3) is sourced from both the electrical power provided by main bus 105 and a reserve of kinetic energy in the spinning of a first flywheel 135. In this example, first hybrid induction machine is a doubly-fed electrical machine comprising a stator housing, housing a stator comprising an input winding for a polyphase AC input signal provided indirectly through a power converter 140. In the explanatory example of FIG. 1, main bus 105 is an AC bus, and power converter 140 is an AC-AC frequency converter, which receives AC power at a first frequency from main bus 105 and outputs AC power at a second frequency. FIG. 9A of U.S. patent application Ser. No. 18/602,889, which is hereby incorporated by reference in its entirety, illustrates one example of an AC-AC frequency converter comprising a rectifier-inverter pair, according to this disclosure. As shown in FIG. 1, the output of power converter 140 is provided to an input port (shown in the figure as S1) of first hybrid induction machine 130. Input port S1 is connected to an input winding of the stator of first hybrid induction machine 130, wherein the input winding comprises a first plurality of phase windings. First hybrid induction machine 130 further comprises a first output winding for a first polyphase AC output signal, wherein the first output winding is connected to a first output port (shown in the figure as S2), and wherein the first output winding comprises a second plurality of phase windings. First hybrid induction machine 130 also includes a second output winding for a second polyphase AC output signal, wherein the second output winding is connected to a second output port (shown in the figure as S3) and wherein the second output winding comprises a third plurality of phase windings. As shown in FIG. 1, first hybrid induction machine 130 includes a rotor having a shaft and disposed to rotate within a magnetic field of the input winding, the first output winding and the second output winding. As shown in figure, the shaft is connected to a first flywheel 135. The rotor of first hybrid inductive machine 130 includes a primary rotor winding for a polyphase AC excitation signal. The primary rotor winding is connected to a first rotor port (shown in the figure as R1), and wherein the primary rotor winding comprises a fourth set of phase windings in a same number of poles as the first plurality of input windings, wherein each phase winding is connected to one or more primary slip rings of a current collector on the shaft. As shown in the figure, the first rotor port R1 is connected to an AC rotor exciter 137. AC rotor exciter 137 supplies a variable frequency AC excitation signal to the rotor through the first rotor port.

First hybrid induction machine 130 operates by receiving AC electrical power at the input port, which when passed through the input winding of the stator, contributes to a magnetic field in the air gap between the stator and rotor. Applying an AC excitation signal to the rotor, in combination with spinning the rotor in the magnetic field in the air gap, induces AC electrical currents in the first and second output windings of the stator, which power the loads drawn by apparatus connected to output ports S2 and S3. When the apparatus connected to the output ports are off, or only drawing moderate loads, the AC power provided from main bus 105 through first power converter 140 suffices to provide the magneto-motive force necessary to keep the rotor spinning at a preferred speed (for example, 10,000 rpm), while also powering the electrical loads drawn by the apparatus at output ports S2 and S3. However, and as discussed in this disclosure, the apparatus at output ports S2 and S3 can draw pulsed current loads which exceed the total power instantaneously available from main bus 105. In such cases, the difference between the power required by the apparatus at the output ports is made up by kinetic energy stored in spinning first flywheel 135. Thus, in response to the apparatus at output ports S2 and/or S3 drawing large, pulsed loads, the inertia of first flywheel 135 provides the power necessary for the rotor of first hybrid induction machine to "power through" the magnetic field in the airgap and provide the power required to meet the instantaneous energy demands of system 100. To make up the shortfall in power available from main bus 105 and power required at the output ports of first hybrid induction machine 130, the rotational speed of first flywheel 135 (and the rotor, to which it is connected) drops below the preferred speed. The output frequency of AC power provided at ports S2 and S3 is a function of the rotational speed of the rotor and the frequency of the AC excitation signal provided by AC rotor exciter 137. In this example, AC rotor exciter 137 comprises a sensor measuring the rotational speed of the rotor and can rapidly vary the frequency of the AC excitation signal provided to the rotor in responses to variations in the rotational speed of the rotor. When the rotor excitation frequency is increased as the flywheel speed reduces in a discharge cycle, the output frequency of the first and second stator outputs may be maintained constant over a wide speed range. Additionally, AC rotor exciter 137 can also tune the magnitude and frequency of the excitation signal provided to the rotor to obtain the magneto-motive force required to spin first flywheel 135 back up to its preferred rotational speed, following a draw-down of kinetic energy to cover a surge in power demand.

Provided that the AC excitation signal provided to the rotor can be dynamically adjusted to keep up with changes in rotor speed, the amplitude and quality of the AC power provided at output ports S2 and S3 is generally unaffected by transient spikes in power demand by apparatus connected to output ports S2 and S3, as well as many variations in the power provided at main bus 105. By the same token, the voltage waveform at main bus 105 is generally unaffected by variations in apparatus connected to the output ports of first hybrid induction machine 130. Put differently, first hybrid induction machine 130 provides the highly desirable technical effect of buffering both its inputs and outputs.

Referring to the illustrative example of FIG. 1, first output S2 powers a first rectifier 145*a*, which in turn provides DC power for a first pulsed load 150*a*. As discussed elsewhere in this disclosure, in embodiments in which more than one load is powered by the output ports of first hybrid induction machine 130, the larger or more energy-intensive load is connected to the port connected to the first output winding (where the first output winding is a direct axis winding), while the smaller, less energy-intensive load is powered by the port connected to the second output winding (where the second output winding is a quadrature axis winding). As shown in FIG. 1, a second pulsed load 150*b* is powered by a first AC-DC converter 147*a*. As noted elsewhere in this disclosure, the direct and quadrature axis windings have minimal electrical cross-coupling interactions.

As shown in FIG. 1, the component architecture for providing surge-buffered, clean power to first pulsed load 150*a* and second pulsed load 150*b* is extensible, and a second instance of the same underlying architecture can be built around a second hybrid induction machine 130'.

While hybrid induction machines (for example, hybrid induction machine 130) are highly effective at excluding noise and other unwanted waveform fluctuations at the main bus from the AC power (or rectified DC power based on the AC output) provided at the output ports of the hybrid induction machines, field testing has shown that unbuffered loads (for example, unbuffered load 110 in FIG. 1) can produce low-frequency noise and transients in the power provided by main bus 105 which, in some cases, cannot be reliably excluded by hybrid induction machine 130, and thus, can potentially affect the operation of power-quality-sensitive apparatus running on power supplied at the output ports of hybrid induction machine 130.

FIG. 2 illustrates a second power system 200 according to this disclosure. As noted previously, for convenience of cross-reference, elements of FIG. 2 already discussed with reference to FIG. 1 are numbered similarly.

Referring to the non-limiting example of FIG. 2, in some embodiments according to this disclosure, unwanted noise and transient spikes in the power provided to pulsed loads 150*a* and 150*b* from hybrid induction machine 130 can be excluded through a combination of filtering and a system architecture for system 200 which creates bulkheads for excluding noise from main bus 105 from the first rotor port of hybrid induction machine 130, and for excluding any noise at one output port of hybrid induction machine 130 from other output port(s) of hybrid induction machine 130.

As shown in FIG. 2, instead of being powered from main bus 105, AC rotor exciter 137 can be independently powered from a DC power source 139. Depending on embodiments, DC power source 139 can be a battery, or provide a rectified DC power signal from an AC source which is separate from main AC bus. Recalling that the waveform characteristics of AC power provided at ports S2 and S3 depend in part on the waveform characteristics of the AC excitation signal provided through AC rotor exciter 137, powering AC rotor exciter from a battery or DC power source decoupled from main bus 105 creates a bulkhead in the system, preventing any noise on main bus 105 from entering hybrid induction machine 130 through the rotor. Put differently, powering AC rotor exciter 137 from DC power source 139 helps ensure that no bus noise in the output at ports S2 and S3 is introduced from the AC excitation signal.

In certain embodiments, a further bulkhead to prevent propagation of noise from main bus 105 reaching pulsed loads 150*a* and 150*b* can be created through the stator winding structure of hybrid induction machine 130. As described in further detail with reference to FIG. 5 of this disclosure, the output at port S2 can be de-coupled from the output at port S3, by winding the stator coils such that first output winding is on the direct axis of the stator, while the second output winding is on the quadrature axis. As such, there is no magnetic or galvanic coupling between the first and second output windings. This decoupling of the stator windings implies that any noise in the power provided at one output port is not electromagnetically propagated to the power provided at the other output port.

As shown in the example of FIG. 2, transients and other unwanted noise originating from other apparatus connected to main bus 105, can be further excluded from the power provided to pulsed loads 150*a* and 150*b* by interposing one or more inductive-capacitive passive filters of a passive damper network 205*a* (for example, a C-L-C filter) downstream of rectifier 145*a* or AC-DC converter 147*a*. The quality of the power provided to certain pulsed loads can be further improved by providing a current limiter 210 upstream of the load. As shown in FIG. 2, for certain pulsed loads (for example, second pulsed load 150*b*), noise or unwanted fluctuations in DC power provided to the load can be further suppressed by providing a pulse-shaping network 215 between passive inductive-capacitive filter 205*b* and the load. Pulse-shaping network 215 can be a network of capacitors configured to sequentially discharge through a chain of inductors (for example, a Guillemin type E network), thereby providing a generally square-wave shaped power pulse to pulsed load 150*b*.

FIG. 3 illustrates a third example system 300 according to this disclosure. Once again, for consistency and convenience of cross-reference, elements of system 300 common to, and discussed with reference to FIGS. 1 and 2 are numbered similarly.

Referring to the illustrative example of FIG. 3, system 300 comprises one or more unbuffered load(s) 110 powered by a main bus 105. In this example, the one or more unbuffered load(s) 110 comprise components of an integrated propulsion system, which includes one or more propulsion motors 120 which receive power from main bus 105 through the chained constituent components of a propulsion converter 115. In this example, the propulsion converter comprises an AC-to-DC propulsion converter 116*a* coupled to a DC filter reactor 116*b*, which is, in turn connected to a DC to AC converter which outputs AC current at a second frequency (f2), and finally, a low-frequency filter 116*d*. Skilled artisans will appreciate that the IPS system shown in FIG. 3 is one, non-limiting example of an unbuffered load 110, and that other examples of unbuffered loads, the mode and magnitude of whose current draws on main bus 105 are sufficient to introduce noise and deviations from an ideal waveform, are possible and within the intended scope of this disclosure.

In example system 300, the one or more unbuffered loads 110 create transients and noise in the voltage waveform on main bus 105. Thus, the measured voltage waveform on main bus 105 comprises a superposition of a sinusoidal waveform at a fundamental frequency f1 (in this case, 60 Hz) as well as the noise and transients introduced by one or more unbuffered loads 110.

To help exclude the induced noise on main bus 105 from the output at the first and second ports of hybrid induction machine 130, system 300 comprises a feed-forward harmonic signal generator 305 connecting both the one or more unbuffered loads 110 to main bus 105. Being connected to both the input of unbuffered load 110 and main bus 105, feed-forward harmonic signal generator 305 can, filter and identify the noise component of the waveform at main bus 105 generated by the one or more unbuffered loads 110. From this, a feed-forward harmonic cancellation signal of equivalent magnitude, but opposite phase to the noise component of the voltage waveform on main bus 105 can be provided to AC rotor exciter 137 and included as part of an AC excitation signal provided to the rotor of hybrid induction machine 130. In this way, while rotor exciter transformer and power supply 310 and frequency converter 140 are connected to main bus 105 and have outputs which can include the noise generated by one or more unbuffered load(s) 110. However, as the waveform properties of the electrical output at ports S2 and S3 of hybrid induction machine 130 depend in significant part on the waveform properties of the excitation signal provided to the rotor by AC rotor exciter 137, the feed-forward harmonic cancellation signal effectively cancels the noise created by unbuffered loads 110 within hybrid induction machine 130. In some embodiments, feed-forward harmonic signal generator 305 comprises a harmonic sensor in combination with an AC filter reactor, as shown in FIG. 3, with inductive coupling. In other embodiments, feed-forward harmonic signal generator

305 comprises a harmonic sensor in combination with a current transformer in series with propulsion converter 116*a*.

Referring to the illustrative example of FIG. 3, system 300 can further include one or more filters 205*b* disposed downstream of output ports (for example, output port S2), and before one or more vacuum breakers (for example, vacuum breaker 315*b*) to further filter and exclude additional noise in the outputs of hybrid induction machine 130 from sources other than one or more unbuffered loads 110. Output port S3 can be connected to a vacuum breaker 315*a* and to a polyphase damper network 205*a*, which can be composed of resistive-capacitive elements, such as described with the example of FIG. 6C. Damper network 205*a* can be configured to absorb harmonic energy and also provides a level of improving mechanical damping of rotor speed oscillations. As discussed in greater detail with respect to FIGS. 6A-6B, these downstream filters can be provided as a damper network on one or more of the stator output windings.

Figure 4:
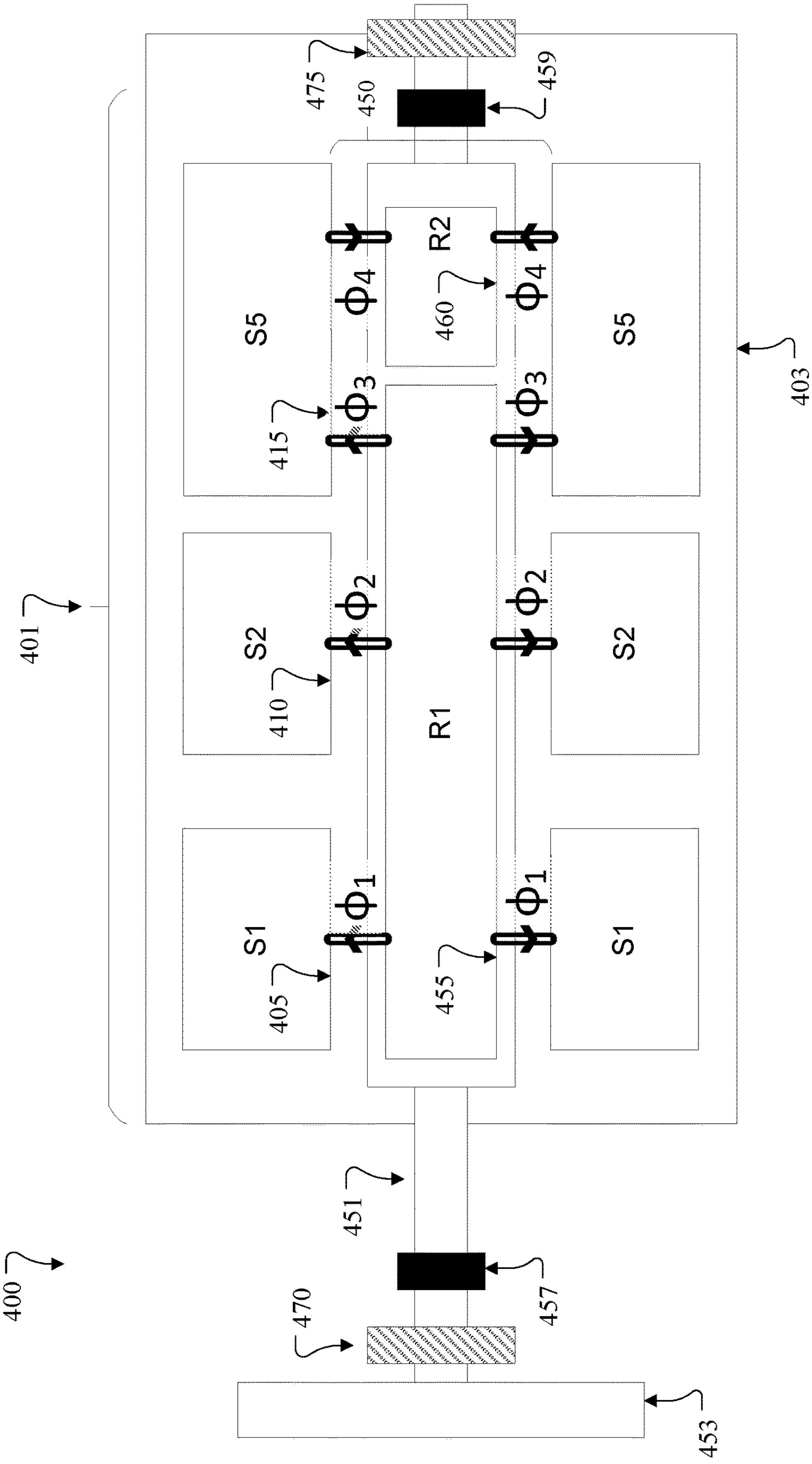
FIG. 4 illustrates aspects of an example of a hybrid induction machine according to this disclosure.

FIG. 4 illustrates an example of a hybrid induction machine 400 according to this disclosure. While the examples of FIGS. 1-3 with reference to a hybrid induction machine 130 comprising a single rotor winding, and two output windings, the present disclosure is not so limited.

The example hybrid induction machine 400 can function as one or more of the hybrid induction machines shown in systems 100-300 in FIGS. 1-3.

Referring to the illustrative example of FIG. 4, hybrid induction machine 400 comprises a stator 401, with three axially distributed windings on a common housing or frame 403. Flywheel 453 and shaft 451 can be supported by bearings 470 and 475. First winding 405 is an input winding, from which the hybrid asynchronous induction machine receives AC power from a power conditioning apparatus (for example, power converter 140 in FIG. 1) powered by main bus 105. In some embodiments, AC power is injected into first winding 405 (which can be a polyphase winding) by a variable-frequency, variable-voltage motor drive to regulate an airgap magnetic flux constant for providing motive power. First winding 405 can be configured in wye, as a distributed double-layer winding, though other configurations are possible and within the contemplated scope of this disclosure.

Stator 401 further comprises a first output winding 410, which provides a first polyphase AC output power induced by the rotation of rotor 450 through the magnetic field within stator 401. In this explanatory example, phase windings of first output winding 410 are configured in delta, rather than wye. Additionally, stator 401 can include a secondary output winding 415, which, analogously to primary output winding 410, provides a second polyphase AC output power and signal induced by the rotation of rotor 450 through the magnetic field within stator 401. Again, in this example, the phase windings of second output winding are configured in delta, rather than wye, but other embodiments are possible and within the contemplated scope of this disclosure. Secondary output winding 415 can be at a higher or lower impedance level than first output winding 410, and of a different electrical time constant.

Hybrid induction machine 400 further comprises a rotor 450, which has a shaft 451, which is supported by bearings 470 and 475, and which rotates along an axis disposed centrally relative to first winding 405, first output winding 410 and second output winding 415. In this example, shaft 451 rotates at a specified speed, ω. Flywheel 453 of an energy storage unit 4 is connected to shaft 451 and provides a reserve of kinetic energy and inertia which buffers the rate of rotation Δω of shaft 451 against changes in rotational resistance due to abrupt variations in the current drawn through one or both of output windings 410 and 415. Rotor 450 further comprises a primary rotor winding 455, which comprises an equivalent number of magnetic poles as each of first output winding 410 and second output winding 415. In this example, the phase windings of primary rotor winding 455 are magnetically isolated from tertiary winding 460. In the absence of any permanent magnetism of rotor 450, to ensure the operation of hybrid induction machine 400, rotor winding 455 receives an AC excitation current (for example, from AC rotor exciter 137 in FIG. 1) through first slip rings 457 to create a primary revolving magnetic field in airgaps of the hybrid induction machine 400.

In this example, rotor 450 can further include a tertiary winding 460, which has a shorter active length than rotor winding 455, and can be bidirectional in power flow, meaning that it can both receive or output power. Rotor winding 455 sets up three radially-oriented airgap magnetic fluxes (designated herein as Φ1, Φ2, and Φ3). Flux Φ1 magnetizes stator 405 which is typically the motoring or primary winding. Flux Φ2 magnetizes stator 410 which is the first output winding. Flux Φ3 magnetizes stator 415 which is the second output winding. According to some embodiments, the load current in output winding 415 creates an additional flux, Φ4 which magnetizes tertiary winding 460 at all speed conditions, whereby Φ4 can be greater in magnitude than flux Φ1, Φ2, and Φ3, since it is directly proportional to the output load current in output winding 415. The power developed by tertiary winding 460 can be fed through polyphase slip rings 459 and contact brushes to a tertiary load, which may be a pulsed or steady state load. In addition to a current multiplication, the power output of tertiary winding 460 can be substantially greater than the output of output windings 410 or 415 due to an amplification effect. Thereafter the tertiary output as AC may be rectified for a pulsed DC load. In this arrangement, the singular machine has three distinct, galvanically isolated and separate output levels, yet overall excitation and machine response can be controlled by one main input current to winding 455.

As shown above, FIG. 4 illustrates that hybrid induction machines according to this disclosure are not limited to a specific non-zero number of stator or rotor windings or input or output ports.

As noted elsewhere herein, embodiments according to this disclosure can help ensure the "cleanliness" of AC power provided at the output ports of a hybrid induction machine by creating system bulkheads across which noise in one part of a power system cannot pass and propagate to other parts of a power system. Examples of such bulkheads include, without limitation, segregating AC rotor exciters (for example, AC rotor exciter 137) from noisy power supplies (for example, main bus 105), and instead powering them from a battery or otherwise independent power source (for example, DC power source 139).

Figure 5A:
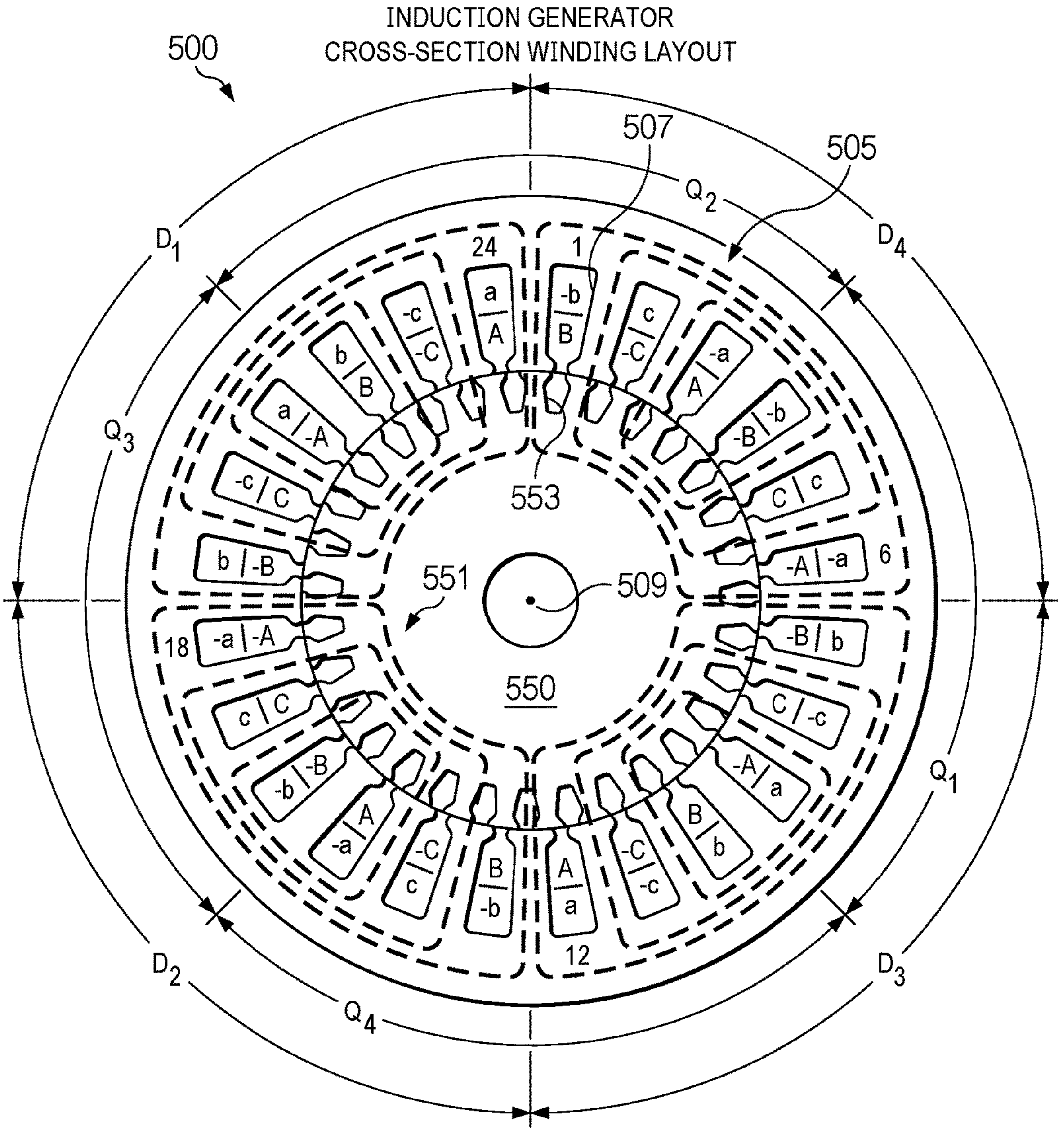
FIGS. 5A and 5B illustrate examples of winding structures for hybrid induction machines according to this disclosure.
Figure 5B:
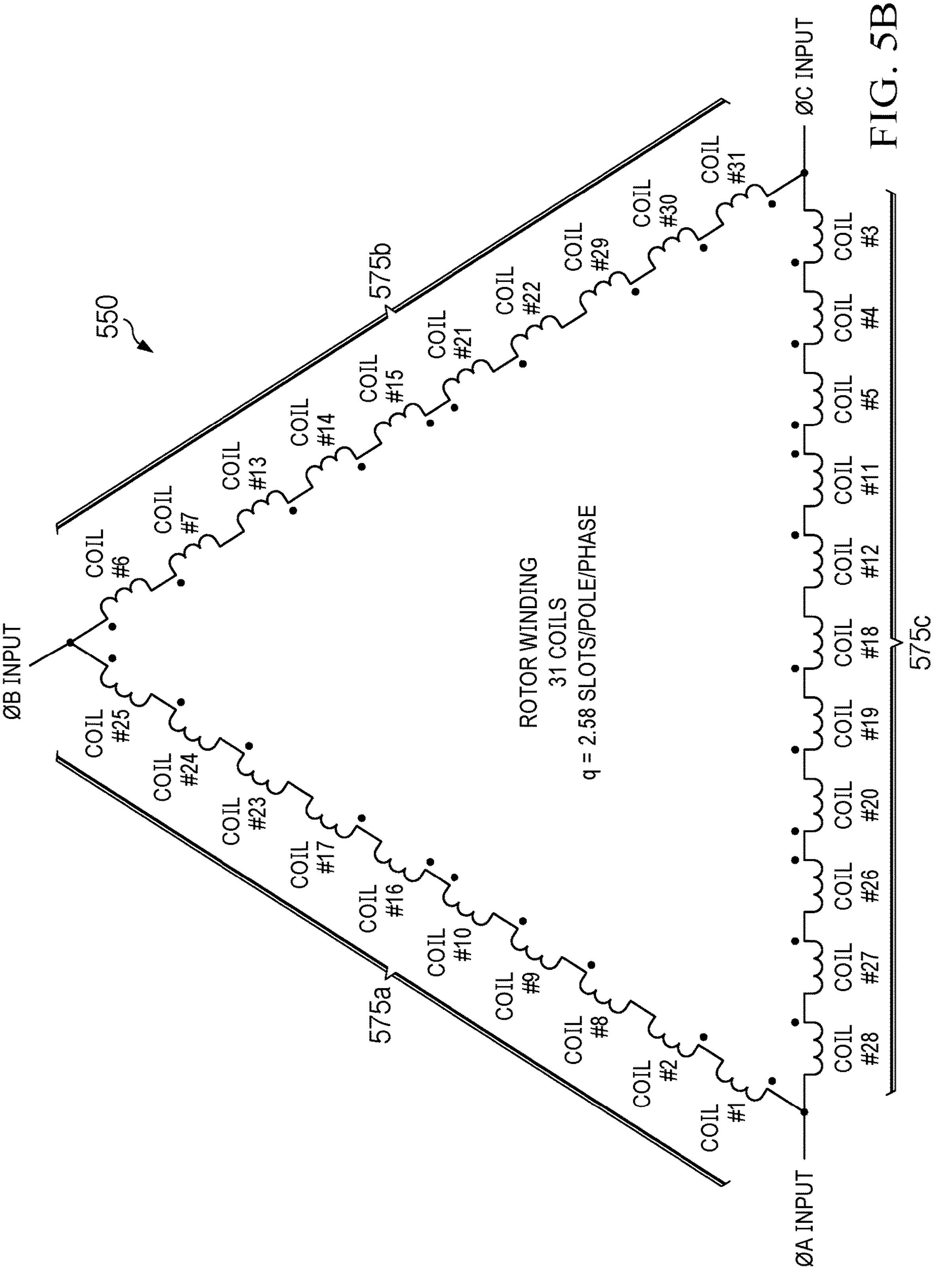

FIGS. 5A and 5B illustrate an example winding structure for a rotor and stator of a hybrid induction machine according to this disclosure, in which system isolation is interposed between a first output winding and a second output winding. By this structure, the AC output at a first stator port (for example, port S2 in FIGS. 1-3) is galvanically and magnetically isolated from the AC output at a second stator port (for example, port S3 in FIGS. 1-3). By this arrangement, the stator output coils are uncoupled, meaning that any electrical noise or unwanted transients in one output coil are not inductively propagated to other coil(s). For consistency and convenience of cross-reference, elements common to both FIGS. 5A and 5B are numbered similarly.

Referring to the illustrative example of FIG. 5A, a cross-section of a stator 500 and rotor 550 according to this disclosure is shown in the figure. Stator 500 comprises a cylindrical stator core 505 of ferromagnetic material with an interior profile characterized by a plurality of winding slots (for example, first stator slot 507) arranged about an axis of rotation 509. Rotor 550 comprises a core 551 configured to rotate around axis of rotation 509, wherein core 551 a second plurality of radial winding slots (for example, first rotor slot 553). While not shown in FIG. 5A, rotor 550 is connected a flywheel which, as described with reference to FIG. 4, acts as a store of kinetic energy which can be drawn down and converted into electrical energy in the event of surges in power demand at an output port, or an interruption in AC power (for example, from main bus 105) to the input port of the hybrid induction machine.

Referring to the illustrative example of FIG. 5A, the slots of stator core 505 are filled with two sets of output windings. The coils of a first stator output winding are wound closer to axis of rotation 509 on the stator core, which, in this example, comprises 24 slots. In this example, the first output winding is wound on the direct axis ("D-axis") of the system, in a 3-phase, four-pole lap winding structure. The 12 constituent coils of the first output winding are shown in capital letters in the figure. Similarly, the 12 constituent coils of the second output winding are wound further from axis of rotation 509 on stator core 505. In this example, the second output polyphase winding is wound on the quadrature ("Q-axis") of the system, in a 3-phase, four-pole lap winding structure.

Flux lines of the induced magnetic field within the apparatus at a given instant in time are shown with dotted lines. As shown in the figure, by aligning the coils of the first output winding with the direct axis of the system, and aligning the coils of the second output winding with the quadrature axis of the system, embodiments according to this disclosure can leverage the fact that the direct and quadrature magnetic axes are, by definition, normal to one another, and thus decoupled from one another. As such, noise in power waveforms generated in the first output winding cannot be propagated to power waveforms generated at the second output winding.

FIG. 5B illustrates an example winding structure for rotor 550. As shown in the explanatory example of FIG. 5B, the 31 slots of rotor core 551 can be filled with three phase windings, shown in the figure as 575A, 575B and 575C wound in delta, wherein first phase winding 575*a* and second phase winding 575*b* comprise 10 coils with the individual coil polarities shown in the figure, and third phase winding 575*c* comprises 11 coils with the individual coil polarities shown in the figure. In the example winding structure of FIG. 5B, there are 2.58 slots/pole/phase.

Figure 6A:
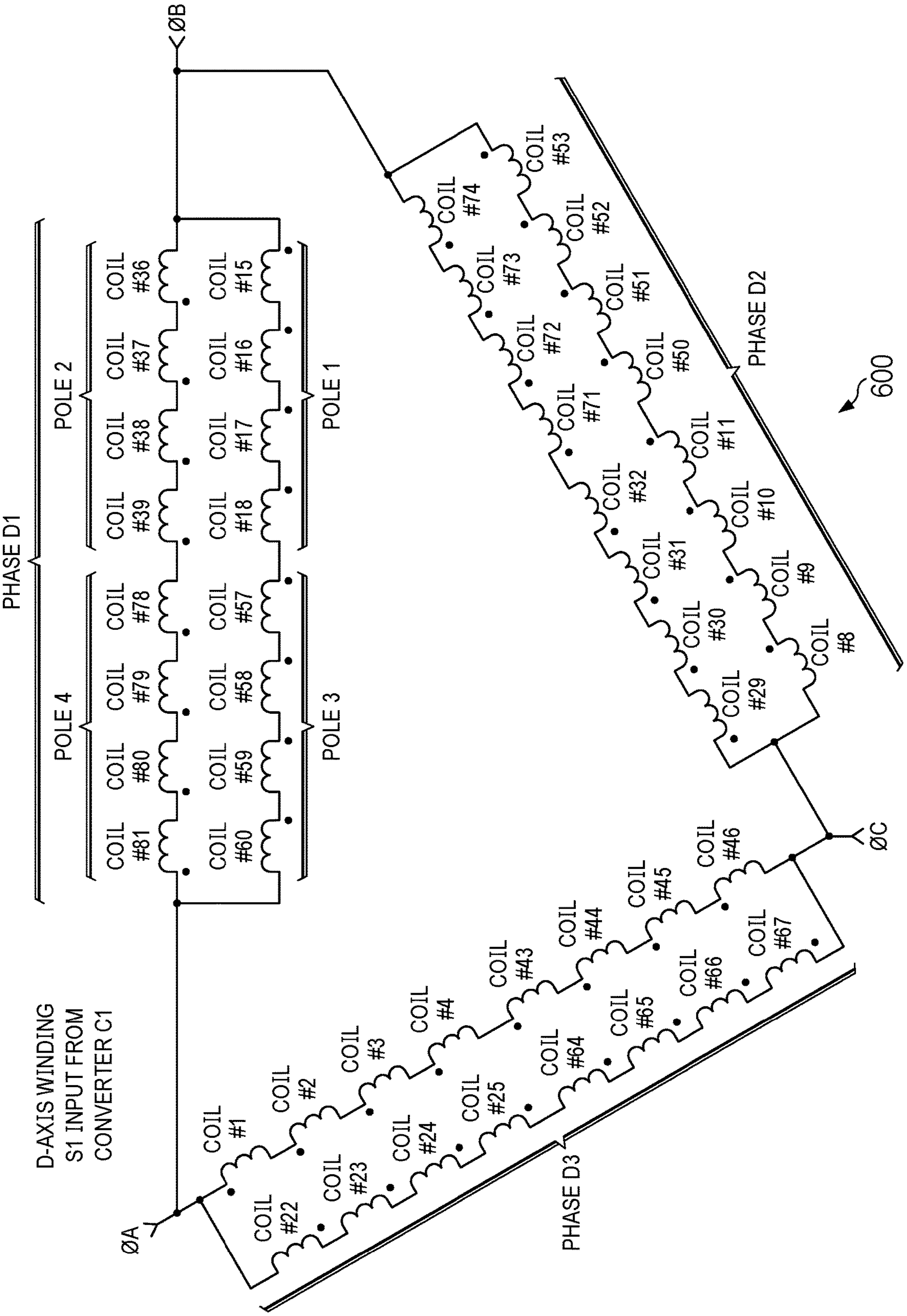
FIGS. 6A-6D illustrate examples of winding structures for hybrid induction machines according to this disclosure.
Figure 6B:
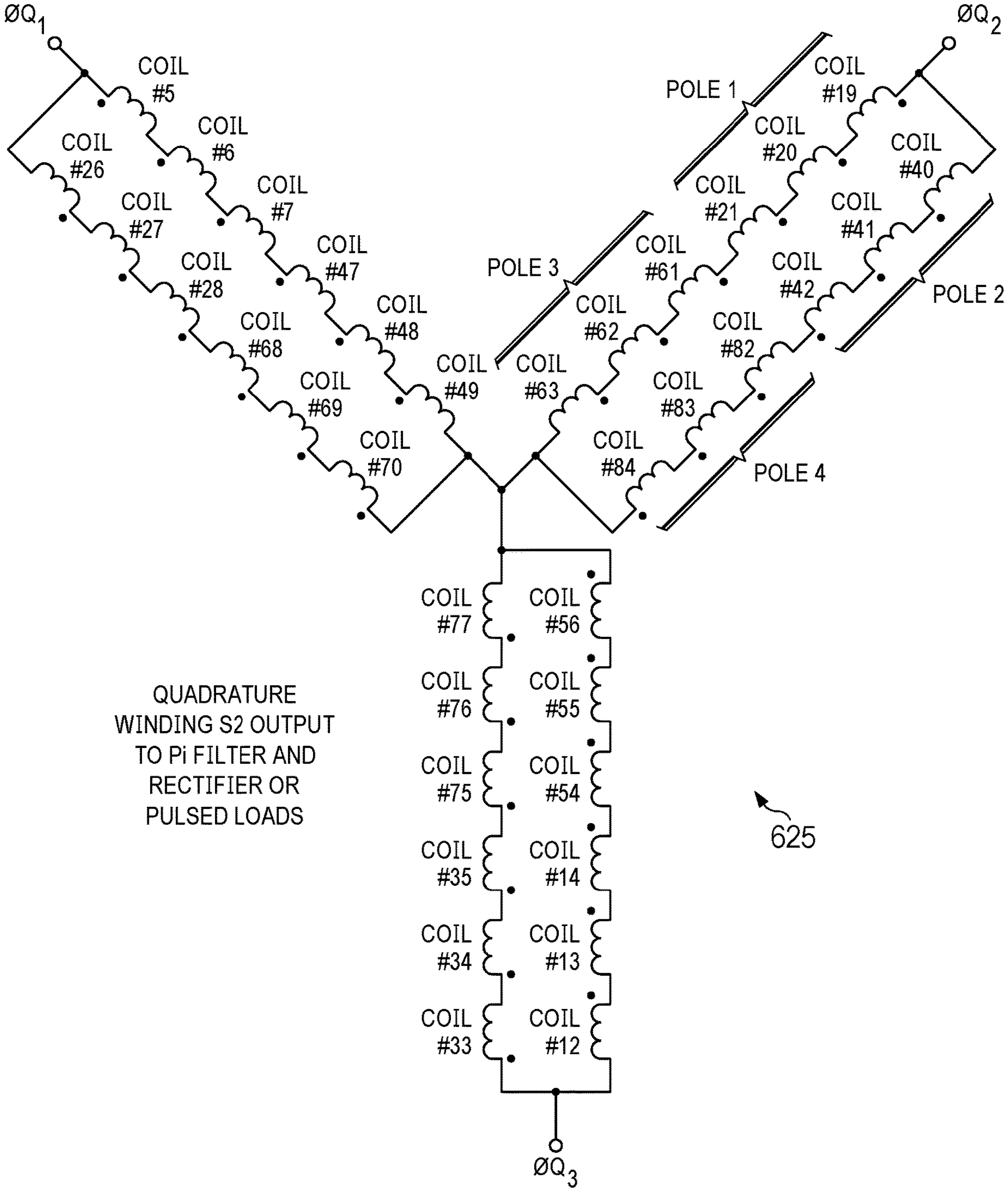

FIGS. 6A through 6B illustrate example coil windings of one example hybrid induction machine (for example, hybrid induction machine 130) in which the techniques for ensuring clean, buffered power at a plurality of output ports described in this disclosure can be implemented. Skilled artisans will appreciate that the examples shown in FIGS. 6A through 6D are illustrative, rather than limitative of winding structures suitable for hybrid induction machines according to this disclosure.

FIG. 6A illustrates a direct axis (D-axis) winding structure of an input winding 600 (for example, the winding connected to the port shown as S1 in FIGS. 1-3) of a hybrid induction machine stator according to this disclosure. As shown in the figure, input winding 600 can comprise three phase windings wound in delta, with the individual coils of each of the phase windings configured to define four magnetic poles.

FIG. 6B illustrates a quadrature-axis (Q-axis) winding structure of a first output winding 625 (for example, the winding connected to the port shown as S2 in FIGS. 1-3) of a hybrid induction machine stator according to this disclosure. As shown in the figure, first output winding 625 can comprise three phase windings wound in wye, with the individual coils of each of the phase windings configured to define four magnetic poles.

Figure 6C:
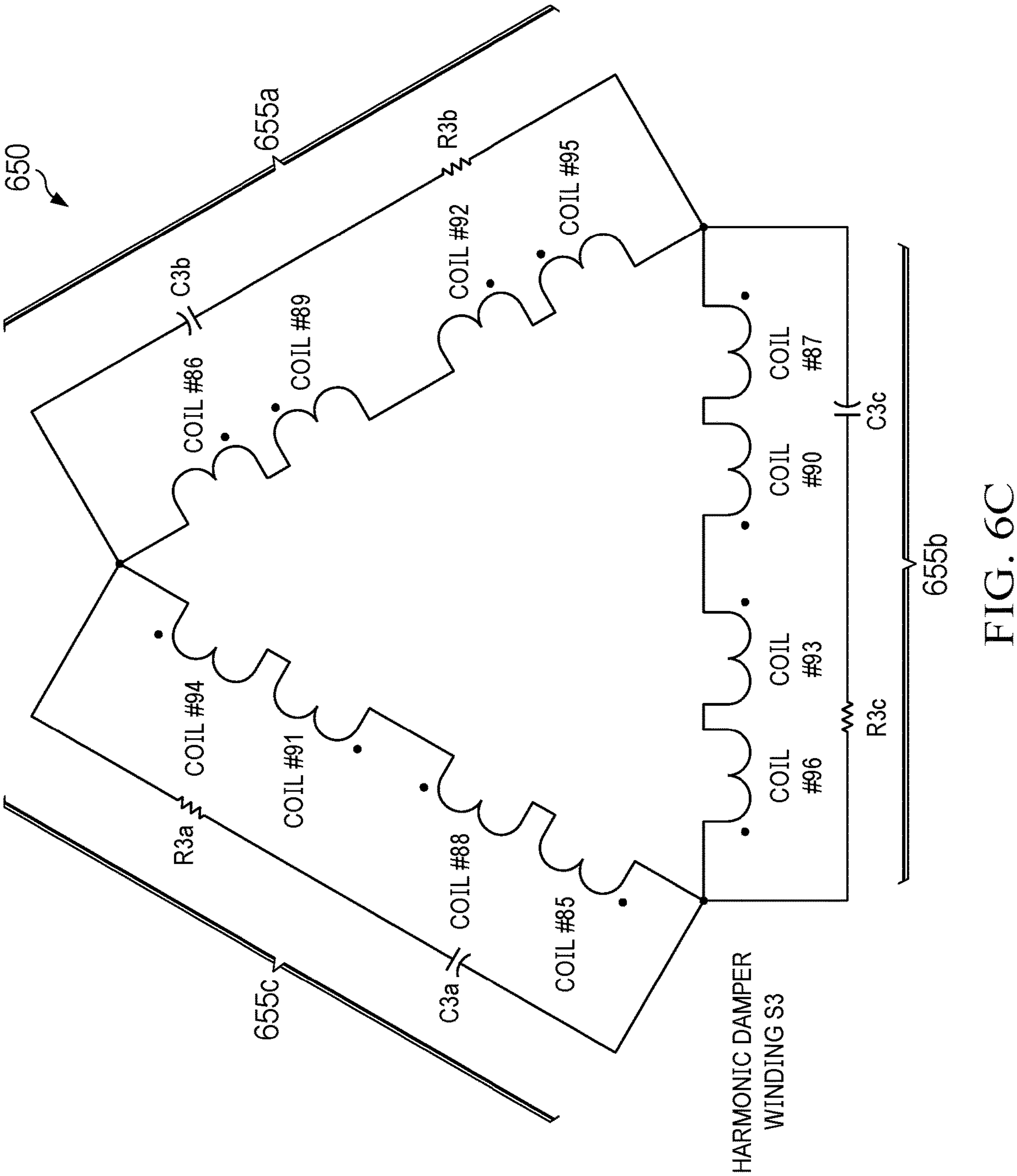
Figure 6D:
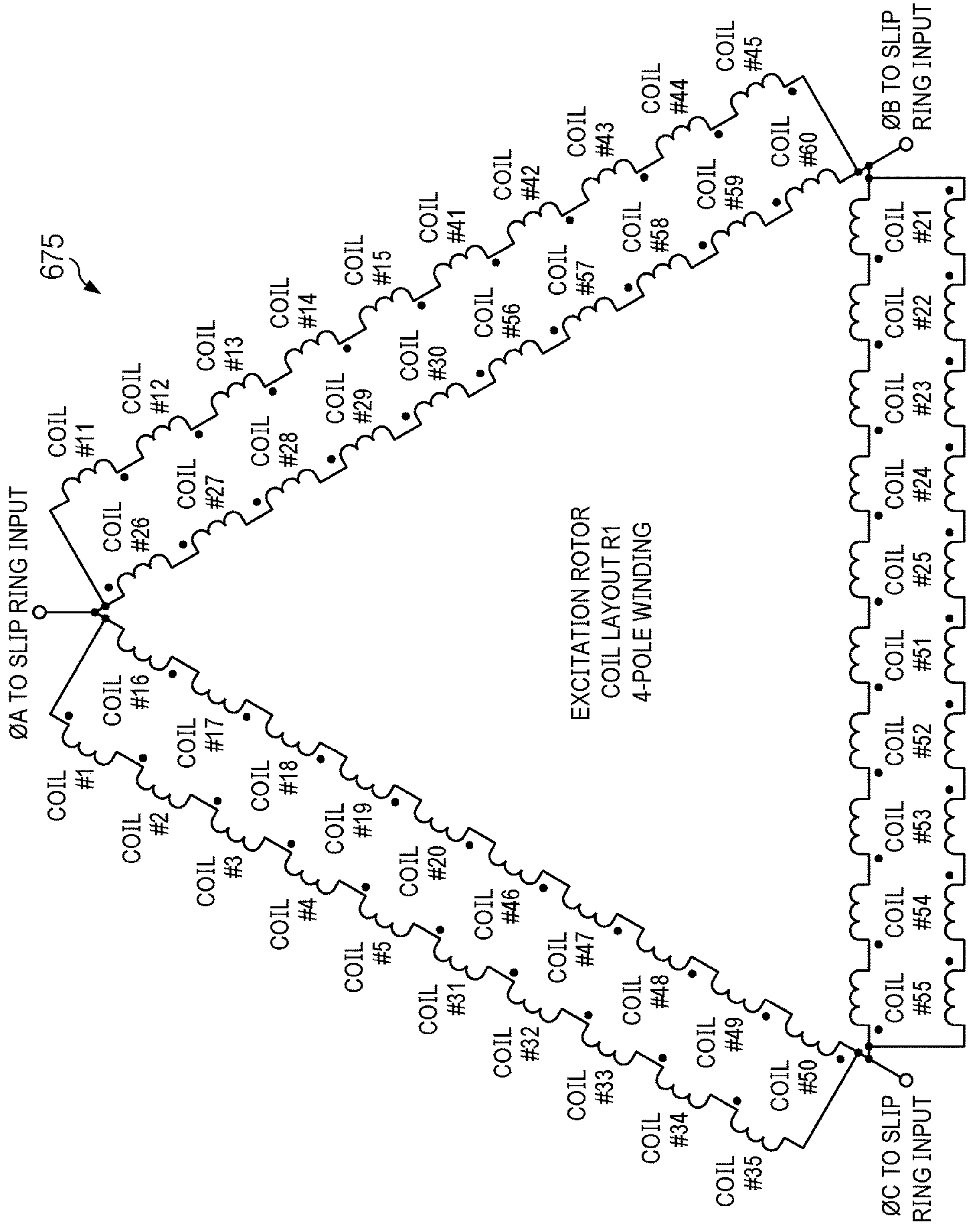

FIG. 6C illustrates a winding structure of a second output winding 650 (for example, the winding connected to the port shown as S3 in FIGS. 1-3) of a hybrid induction machine stator used as a damper winding according to this disclosure. As shown in the figure, second output winding 650 can comprise three phase windings wound in delta, with the individual coils of each of the phase windings configured to define four magnetic poles. As a further safeguard against electrical noise from unbuffered loads on a shared bus (for example, unbuffered load(s) 110) adding noise to the power waveforms obtained at the stator output ports of a hybrid induction machine, the phase windings of one or more stator output coils can be provided with an integral passive filter network. As shown in the figure, three sets of R-C filters (shown in the figure as 655*a*, 655*b*, and 655*c*) can be connected in parallel to each of the phase windings of second output winding 650. FIG. 6D illustrates a winding structure of a primary rotor winding 675 (for example, the winding connected to the port shown as R1 in FIGS. 1-3) of a hybrid induction machine according to this disclosure. As shown in the figure, primary rotor winding 675 can comprise three phase windings wound in delta, with the individual coils of each of the phase windings configured to define four magnetic poles.

Figure 7:
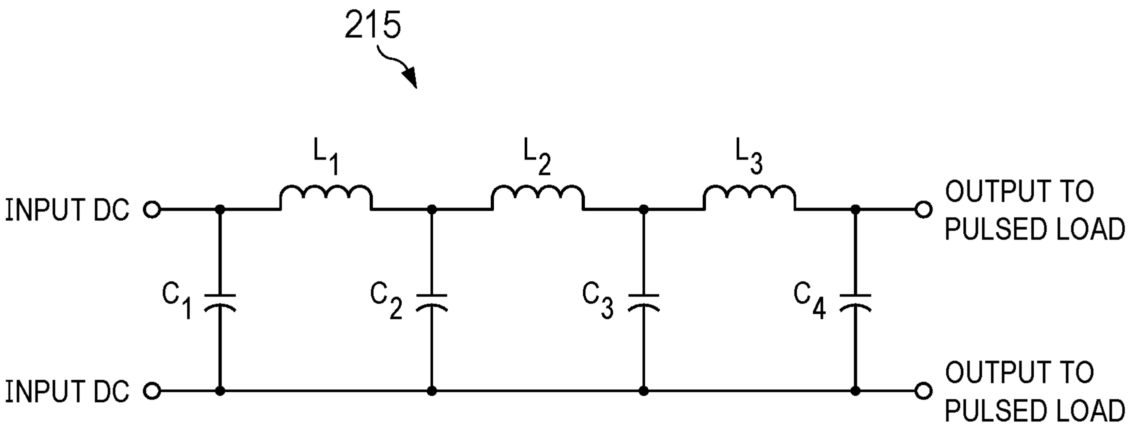
FIG. 7 illustrates an example of a pulse shaping network according to this disclosure.
Figure 8:
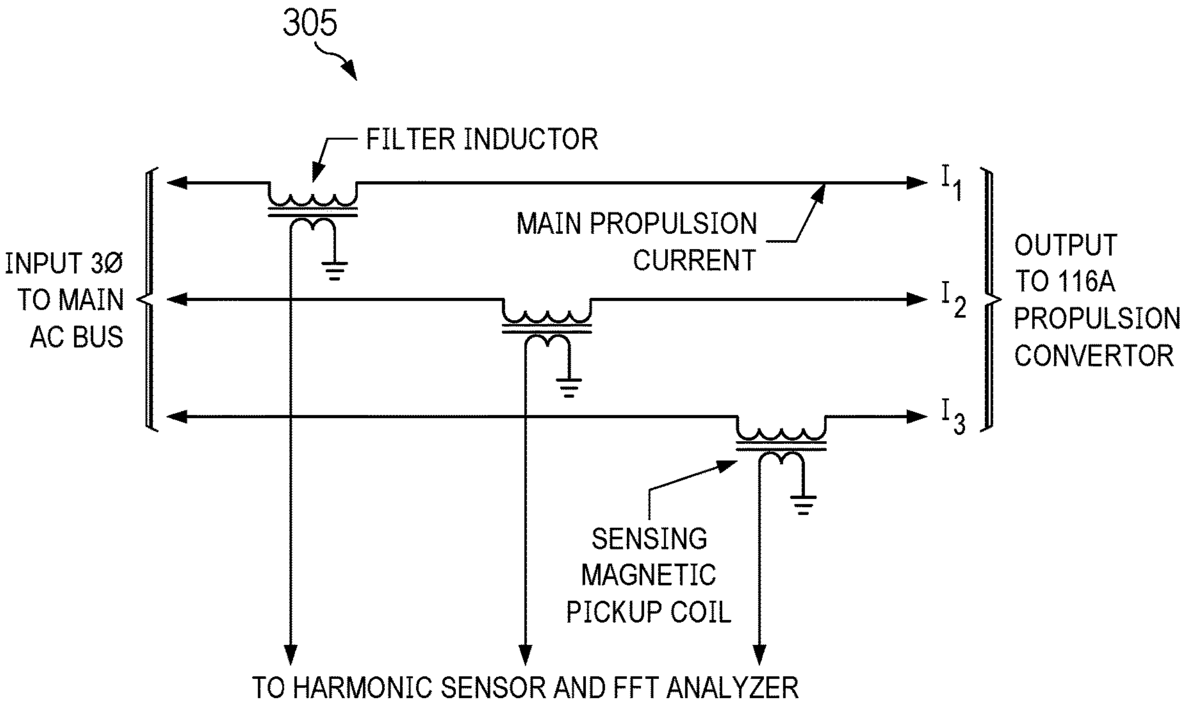
FIG. 8 illustrates an example of a feed-forward harmonic signal generator according to this disclosure.

FIG. 7 illustrates an example circuit architecture for a pulse shaping network (for example, pulse shaping network 215 in FIG. 2) according to this disclosure. As shown in the figure, pulse shaping networks according to this disclosure can comprise passive networks of inductors and capacitors configured to receive DC inputs and provide shaped outputs to a pulsed load. FIG. 8 illustrates an example circuit architecture of a feed-forward harmonic generator (for example, a feed-forward harmonic magnetic sensor according to this disclosure, such as feed-forward harmonic signal generator 305 inf FIG. 3).

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for stabilizing and smoothing an electric power supply, the system comprising:

a hybrid induction machine comprising:

a stator housing;

a stator disposed in the stator housing, the stator comprising:

an input winding for a polyphase alternating current (AC) input signal, wherein the input winding is connected to an input port, and wherein the input winding comprises a first plurality of phase windings;

a first output winding for a first polyphase AC output signal, wherein the first output winding is connected to a first output port, and wherein the first output winding comprises a second plurality of phase windings; and a second output winding for a second polyphase AC output signal, wherein the second output winding is connected to a second output port, and wherein the second output winding comprises a third plurality of phase windings; and a rotor having a shaft and disposed to rotate within a magnetic field of the input winding, the first output winding, and the second output winding, wherein the shaft is connected to a flywheel, the rotor further comprising a primary rotor winding for a polyphase AC excitation signal, wherein the primary rotor winding is connected to a first rotor port, wherein the primary rotor winding comprises a fourth set of phase windings in a same number of poles as the first plurality of phase windings, and wherein each of the fourth set of phase windings is connected to one or more primary slip rings of a current collector on the shaft;

a rotor exciter connected to the first rotor port and configured to provide an AC excitation signal, wherein the rotor exciter is configured to dynamically adjust a frequency of the AC excitation signal in response to variations in rotational speed of the rotor to maintain a frequency of the first and second polyphase AC output signals at a substantially constant value during discharge of kinetic energy from the flywheel; and a power converter configured to receive power from a main bus and provide AC power at a first frequency to the input port.

2. The system of claim 1, wherein:

the first output winding comprises a direct axis winding, the second output winding comprises a quadrature axis winding, and the first output winding and the second output winding are electrically and magnetically uncoupled from one another.

3. The system of claim 2, wherein:

a primary pulsed load is connected to the first output port, a secondary pulsed load is connected to the second output port, and the primary pulsed load is larger than the secondary pulsed load.

4. The system of claim 1, wherein the power converter is an AC-AC frequency converter.

5. The system of claim 1, wherein the second output winding is a harmonic damper winding comprising an isolated RC filter network.

6. The system of claim 1, further comprising a feed-forward harmonic signal generator disposed between the main bus and an external load configured to generate harmonic currents, wherein the main bus is an AC power bus, wherein the feed-forward harmonic signal generator comprises at least one of: a harmonic sensor in combination with an AC filter reactor or a harmonic sensor in combination with a current transformer, and wherein the feed-forward harmonic signal generator is configured to generate and pass a compensation signal tuned to harmonics in alternating current provided by the main bus to the external load.

7. The system of claim 1, wherein a first output voltage at the first output port is different than a second output voltage at the second output port.

8. The system of claim 1, wherein:

the stator has a body comprising conductor slots disposed radially relative to an axis of rotation of the rotor, the first output winding is a direct axis winding disposed on the conductor slots at a first radius relative to the axis of rotation of the rotor, the second output winding is a quadrature axis winding disposed on the conductor slots at a second radius relative to the axis of rotation of the rotor, and the first radius is less than the second radius.

9. The system of claim 8, wherein:

the rotor has a body comprising radially directed conductor slots, and the rotor is configured to be excited by a variable-frequency polyphase power supply to enable stator output frequency to be maintained at a constant value with rotor speed variations over a 20:1 range.

10. A hybrid induction machine comprising:

a stator housing;

a stator disposed in the stator housing, the stator comprising:

an input winding for a polyphase alternating current (AC) input signal, wherein the input winding is connected to an input port, and wherein the input winding comprises a first plurality of phase windings;

a first output winding for a first polyphase AC output signal, wherein the first output winding is connected to a first output port, and wherein the first output winding comprises a second plurality of phase windings; and a second output winding for a second polyphase AC output signal, wherein the second output winding is connected to a second output port, and wherein the second output winding comprises a third plurality of phase windings;

a rotor having a shaft and disposed to rotate within a magnetic field of the input winding, the first output winding, and the second output winding, wherein the shaft is connected to a flywheel, the rotor further comprising a primary rotor winding for a polyphase AC excitation signal, wherein the primary rotor winding is connected to a first rotor port, wherein the primary rotor winding comprises a fourth set of phase windings in a same number of poles as the first plurality of phase windings, and wherein each of the fourth set of phase windings is connected to one or more primary slip rings of a current collector on the shaft; and a rotor exciter connected to the first rotor port and configured to provide an AC excitation signal, wherein the rotor exciter is configured to dynamically adjust a frequency of the AC excitation signal in response to variations in rotational speed of the rotor to maintain a frequency of the first and second polyphase AC output signals at a substantially constant value during discharge of kinetic energy from the flywheel;

wherein the input port is configured to receive AC power at a first frequency from a main bus via a power converter.

11. The hybrid induction machine of claim 10, wherein:

the first output winding comprises a direct axis winding, the second output winding comprises a quadrature axis winding, and the first output winding and the second output winding are electrically and magnetically uncoupled from one another.

12. The hybrid induction machine of claim 11, wherein:

the hybrid induction machine is configured to power a primary pulsed load via the first output port, the hybrid induction machine is configured to power a secondary pulsed load via the second output port, and the primary pulsed load is larger than the secondary pulsed load.

13. The hybrid induction machine of claim 10, wherein the AC power received at the input port is converted to the first frequency from a lower, main bus frequency via the power converter.

14. The hybrid induction machine of claim 10, wherein the first output winding is configured to be of a different time-constant than the second output winding.

15. The hybrid induction machine of claim 10, wherein the second output winding is a harmonic damper winding comprising an isolated RC filter network.

16. The hybrid induction machine of claim 10, wherein:

the rotor exciter is configured to provide a feed-forward harmonic cancellation signal from a feed-forward harmonic signal generator based on an external load with high current harmonics, the feed-forward harmonic signal generator comprises at least one of: a harmonic sensor in combination with an AC filter reactor or a harmonic sensor in combination with a current transformer, and the feed-forward harmonic signal generator is configured to generate and pass a compensation signal tuned to harmonics in alternating current provided by a main bus.

17. The hybrid induction machine of claim 10, wherein a first output voltage at the first output port is configured to be different than a second output voltage at the second output port.

18. The hybrid induction machine of claim 10, wherein:

the second output winding is configured to create a quadrature axis flux that magnetizes a second polyphase rotor winding based on a magnitude of a load current of the second output winding, and the second polyphase rotor winding has an independent set of current collectors to an ancillary output port.

19. The hybrid induction machine of claim 18, wherein the second polyphase rotor winding is configured to be excited in a separate magnetic circuit from an exciting magnetic circuit of the primary rotor winding to the second output winding, allowing load current to control magnetization.

20. The hybrid induction machine of claim 19, wherein:

two stator ports and an ancillary output port of the second rotor winding are configured to have separate output voltage levels, and overall excitation and machine response are configured to be controlled by one main excitation winding on the rotor.

* * * * *